May 19, 1959

J. A. MEREDITH 2,887,300

REAMER ATTACHMENT FOR EARTH AUGERS

Filed Jan. 23, 1957

INVENTOR.
JOHN A. MEREDITH
BY
*B. W. Messenger*
ATTORNEY

United States Patent Office 2,887,300
Patented May 19, 1959

2,887,300

REAMER ATTACHMENT FOR EARTH AUGERS

John A. Meredith, Denver, Colo., assignor to Amalgamated Equipment Co., a corporation of Colorado Application January 23, 1957, Serial No. 635,672

3 Claims. (Cl. 255—73)

The present invention relates to an attachment for earth augers and, more particularly, to a reamer attachment for earth augers useful when it is desired to bell out the top of a caisson hole drilled by an earth auger.

An object of this invention is to provide an attachment which may be readily secured to earth drilling apparatus in order to cut a tapered face or collar at the top of a caisson hole.

Another object of this invention is to provide a taper-cutting attachment which may be readily mounted on the Kelly bar of earth drilling apparatus in working position above a conventional earth auger without the necessity of drilling an additional hole through the Kelly bar.

A further object of this invention is to provide such a reamer attachment, the cutter plates of which may be readily moved to non-interfering positions, so that the entire earth auger and taper-cutting attachment apparatus may be lowered into the caisson hole for clean-out or for further extension of said hole.

Further objects and advantages of the present invention will be apparent from the accompanying drawings, in which—

Figure 2:
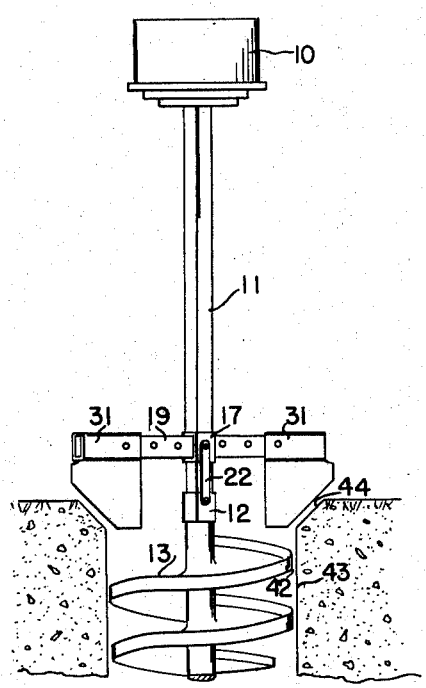
Figure 3:
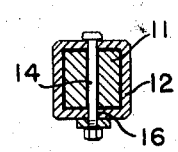
Figure 4:
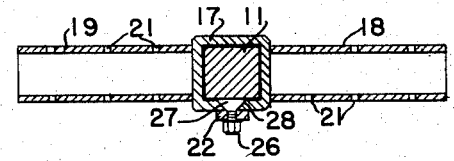
Figure 5:
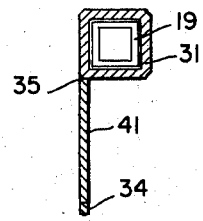
Figure 1:
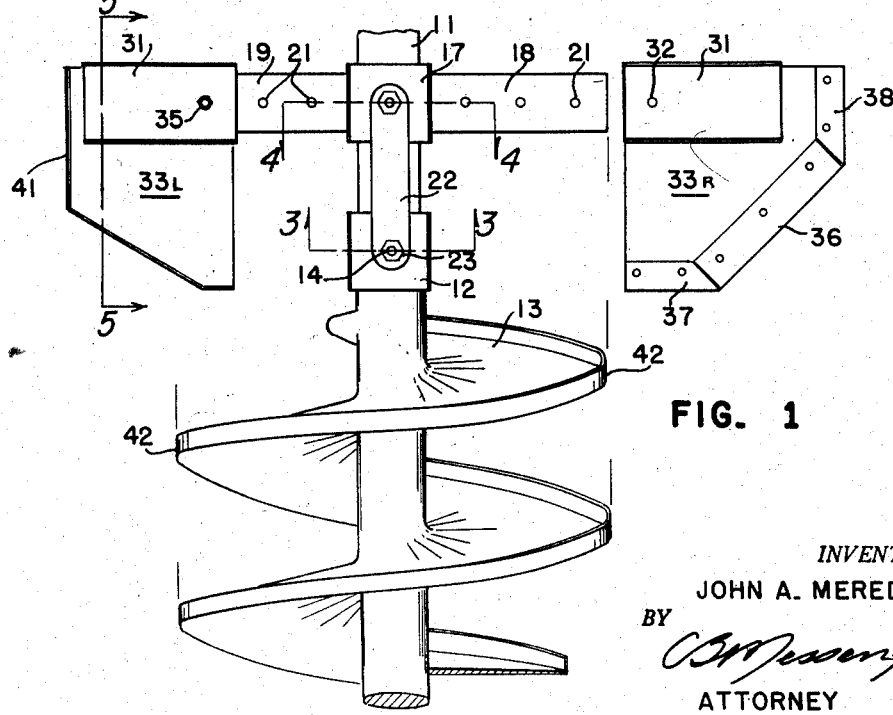

Fig. 1 is an elevation showing preferred embodiments of this invention,

Fig. 2 is an elevation in partial cross-section showing the method of use for a modified type of apparatus made in accordance with this invention, Fig. 3 is a cross-sectional view taken along the line 3—3 of Fig. 1, Fig. 4 is a cross-sectional view taken along the line 4—4 of Fig. 1, and Fig. 5 is a cross-sectional view taken along the line 5—5 of Fig. 1.

Briefly stated, the present invention provides an attachment and mounting apparatus for said attachment which may be used in conjunction with conventional earth auger apparatus to cut or ream a tapered section or collar at the top of caisson holes where such taper is necessary or desirable for wider distribution of the support provided by the caisson column. A main feature of the attachment is the provision of a mounting collar and support arms for the attachment which may be placed and held in position adjacent the earth auger attachment without the necessity of providing additional bar weakening holes through the Kelly bar.

Additional features of the invention provide for the selective positioning of the cutter plates on the support arms in telescoped or extended positions in order to cut the desired size of taper. When the taper-cutting attachment is not being used, the cutter plates are movable to a position so that the entire apparatus may be lowered into the caisson hole to remove the dirt loosened by the cutter attachment that has fallen to the bottom of the caisson hole.

The detailed features of an embodiment of this invention are shown in the accompanying drawings, in Fig. 1 of which it will be noted that the Kelly bar 11 of conventional power-driven drilling apparatus 10 is received in the socket 12 of conventional type earth auger apparatus 13. With the end of the Kelly bar positioned in the socket 12, a lock pin 14 is provided which passes through an opening 16 in the Kelly bar 11 to hold the earth auger 13 and Kelly bar 11 in assembled driving connection. In Fig. 1 the taper-cutting reamer attachment is shown mounted on the Kelly bar 11 in position above the earth auger 13 and above the socket 12 of such earth auger. This attachment comprises a hollow socket 17 of size and shape to fit in mating reciprocal contact with the Kelly bar 11. Attached to the socket 12 are laterally extending support arms 18 and 19 which extend outwardly from opposite sides of the collar 17. These support arms which may be of solid material or open construction as shown are provided with a plurality of spaced openings 21. In order to hold the collar 17 and support arms 18 and 19 in desired position above the socket 12 of earth auger 13, a spacer or strap member 22 is provided which has an opening 23 through which the earth auger attaching pin 14 is passed. A second opening 24 at the opposite end of the spacer strap 22 engages the outwardly extending shank 26 of a stud bolt 27 which has a countersunk head for mating engagement with a tapered opening 28 in the collar 17. A nut 29 threadedly received on the shank 26 holds the strap 22 in fixed position with respect to the collar 17 and thereby holds the collar 17 and support arms 18 and 19 in desired position above the socket 12.

Through use of countersunk bolt 27 in this arrangement, the collar 17 is free to move reciprocally along the Kelly bar 11 to its operative position, and it is unnecessary to drill a second hole through the Kelly bar in order to mount the reamer attachment. Since any additional holes in the Kelly bar would tend to weaken this driving member, the present structure beneficially provides correct and positive placement of the reamer attachment without the necessity of weakening the Kelly drive bar.

As further shown in Figs. 1 and 2, the cutter plate elements used in the present embodiment of the invention provide socket members 31 adapted for telescoping engagement with the support arms 18 and 19. These sockets 31 are further provided with one or more drilled openings 32 which may be selectively brought into alignment with the drilled holes 21 in the support arms 18 and 19 to be held in such adjusted position by dowels 35 extending through the holes 32 and 21. Since a plurality of drilled openings 21 are provided in the support arms 18 and 19, the socket members may be moved laterally along the support arms 18 and 19 to selected adjusted positions when it is desired to cut tapered sections for various sized drilled holes or different size tapered sections for any particular size hole.

In Fig. 1 cutter plate 33L is secured to the socket 31 by a weld 35 in position extending from one wall of the socket 31 as shown in Fig. 5 to provide clearance for arm 19 or in other suitable manner so that the plate will revolve with the socket 31 and support arm 19 when the Kelly bar is rotated. The cutter plate 33L is provided with at least one angularly disposed edge 34 which extends outwardly and downwardly with respect to the support arms so that the desired taper may be cut. Necessarily, the angularity of the edge 34 may be changed to cut various shaped tapers at the top of drilled holes. On a modified type of cutter plate 33R, cutter bits 36, 37 and 38 are provided for attachment to and along the cutting edges of the plate 33R in order to more efficiently cut the earth and prevent wear of the plate 33R. Actually various sizes and shapes of cutting plates may be provided, as is shown in Fig. 1, in which plate 33R is shown removed from the support arm 18 while the cutter plate 33L is shown mounted on the support arm 19. A feature of the cutter plate 33L is embodied in the fact that it may be telescoped inwardly along the support arm 19 to a fully retracted position, so that the outer edge 41 is within a cylinder formed by the outer cutting edge 42 of the earth auger 13. Accordingly, when plates such as 33L are used and are moved to their retracted position, the earth auger 13 and the reamer attachment can be lowered down into the hole cut by the earth auger 13. This feature is desirable, since it will be necessary to clean out loose materials which fall into the drilled caisson hole when the taper collar is being cut.

When larger size taper-cutting plates, such as cutter plate 33R, are used, the entire socket 31 and cutter plate 33R may be moved from the support arm 18, and thereafter the apparatus inclusive of auger 13, collar 17 and support arms 18 and 19 may be lowered into the drilled caisson hole. For this type mounting, it is important that the support arm 18 does not extend beyond the confines of the cylinder defined by the cutter edges 42 of auger 13.

Fig. 2 illustrates the type of drilled caisson hole 43 with tapered collar 44 that may be cut with this apparatus. Where an on-grade concrete floor is being poured, it will be obvious that the provision of the tapered collar 44 at the top of the drilled caisson support column will provide additional support for such floor.

Figs. 3 and 4, of course, further illustrate features previously described.

While a separate embodiment of the invention has been shown and described, it will be apparent that the features of this invention will be adaptable to various modifications and changes. All such modifications and changes as come within the scope of the hereunto appended claims are deemed to be a part of this invention.

What is claimed is:

1. A reamer attachment for earth auger apparatus which includes a power-driven Kelly bar of non-circular cross-section and an auger drill bit connected to said Kelly bar by a pin between said auger drill and Kelly bar comprising a collar of size and shape for mating and non-turning engagement on and with respect to said Kelly bar, a stud supported by and extending outwardly from said collar, support arms on and extending outwardly from said collar, cutter plate elements on said support arms, means for selectively positioning said cutter plate elements along said support arms in extended and telescoped positions, and a spacer member connected to said stud and auger pin for holding said reamer attachment operatively positioned on said Kelly bar adjacent said auger drill bit.

2. A reamer attachment for earth auger apparatus which includes a power-driven Kelly bar of non-circular cross-section and an auger drill bit connected to said Kelly bar by a pin between said auger drill and Kelly bar comprising a collar of size and shape for mating and non-turning engagement on and with respect to said Kelly bar, a stud supported by and extending outwardly from said collar, support arms on and extending outwardly from said collar having a plurality of spaced openings drilled therein, socket members for telescoping engagement with said support arms likewise provided with drilled openings for selective mating alignment with the drilled openings in said support arms, dowels engageable through said openings for holding said support arms and sockets in desired position, cutter plates on said sockets, and a spacer member connected to said stud and auger pin for holding said reamer attachment operatively positioned on said Kelly bar adjacent said auger drill bit.

3. A reamer attachment for earth auger apparatus which includes a power-driven Kelly bar of non-circular cross-section and an auger drill bit connected to said Kelly bar by a pin between said auger drill and Kelly bar comprising a collar of size and shape for mating and non-turning engagement on and with respect to said Kelly bar, a stud supported by and extending outwardly from said collar, support arms on and extending outwardly from said collar having a plurality of spaced openings drilled therein, socket members for telescoping engagement with said support arms likewise provided with drilled openings for selective mating alignment with the drilled openings in said support arms, dowels engageable through said openings for holding said support arms and sockets in desired position, cutter plates on said sockets, and a spacer member connected to said stud and auger pin for holding said reamer attachment operatively positioned on said Kelly bar adjacent said auger drill bit, said cutter plates having at least one outwardly disposed edge at an angle with respect to the axis of said Kelly bar whereby a flared chamfer may be reamed at the top of drilled caisson holes when said cutter plates are in the extended position and said cutter plates and sockets being of such size and shape as to be movable to the telescoped position wherein the cutter plates and sockets will be wholly within the cylindrical surface defined by the auger drill bit.

References Cited in the file of this patent

UNITED STATES PATENTS

| | | |
|---|---|---|
| 757,739 | Haines | Apr. 19, 1904 |
| 1,076,817 | Chase | Oct. 28, 1913 |